United States Patent [19]

Meier et al.

[11] Patent Number: 5,339,342

[45] Date of Patent: Aug. 16, 1994

[54] FUEL ASSEMBLY FOR A BOILING WATER REACTOR WITH A REDUNDANT SUPPORT STRUCTURE AND A LOCKED FUEL ASSEMBLY CASE

[75] Inventors: Werner Meier, Kunreuth; Hans-Joachim Lippert, Hoechstadt/Aisch; Peter Rau, Leutenbach; Lothar Koerner, Hoechberg, all of Fed. Rep. of Germany

[73] Assignee: Siemens Aktiengesellschaft, Munich, Fed. Rep. of Germany

[21] Appl. No.: 3,105

[22] Filed: Jan. 11, 1993

[30] Foreign Application Priority Data

Jan. 9, 1992 [DE] Fed. Rep. of Germany ....... 4200363
Apr. 15, 1992 [DE] Fed. Rep. of Germany ....... 4212645

[51] Int. Cl.⁵ .................................................. G21C 3/32
[52] U.S. Cl. .................................... 376/446; 376/303
[58] Field of Search ................... 376/303, 220, 446; 976/DIG. 19, DIG. 103

[56] References Cited

U.S. PATENT DOCUMENTS

| | | | |
|---|---|---|---|
| RE. 27,173 | 5/1969 | Lass et al. ............................. | 376/448 |
| 3,133,867 | 5/1964 | Frisch .................................... | 376/448 |
| 3,607,639 | 7/1968 | Van Santen ........................... | 376/438 |
| 3,863,770 | 2/1975 | Shallenberger et al. .............. | 212/14 |
| 3,878,042 | 4/1975 | Curulla et al. ........................ | 376/448 |
| 3,920,517 | 11/1975 | Sasaki et al. ......................... | 376/448 |
| 4,038,133 | 7/1977 | Bittermann et al. .................. | 376/448 |
| 4,076,586 | 2/1978 | Bideau et al. ......................... | 376/448 |
| 4,304,631 | 12/1981 | Walton et al. ........................ | 376/327 |
| 4,540,545 | 9/1985 | Kondo .................................. | 376/364 |
| 4,624,829 | 11/1986 | Jackson ................................ | 376/448 |
| 4,963,318 | 10/1990 | Johansson et al. ................... | 376/446 |
| 5,002,724 | 3/1991 | Elkins et al. ......................... | 376/435 |

FOREIGN PATENT DOCUMENTS 9113441 9/1991 PCT Int'l Appl. .

Primary Examiner—Donald P. Walsh
Assistant Examiner—Meena Chelliah
Attorney, Agent, or Firm—Herbert L. Lerner; Laurence A. Greenberg

[57] ABSTRACT

A fuel assembly for a boiling water reactor includes approximately mutually parallel fuel rods in a bundle having upper and lower ends. A skeleton holding the bundle has a handle, an upper tie plate retained on the handle at the upper end of the bundle, a lower tie plate at the lower end of the bundle, and at least one support element joining together the lower tie plate and the upper tie plate. The skeleton and the bundle are inserted in a fuel assembly case. A redundant support device holds the lower tie plate, the fuel assembly case and the upper tie plate together, when the handle is lifted.

20 Claims, 8 Drawing Sheets

FUEL ASSEMBLY FOR A BOILING WATER REACTOR WITH A REDUNDANT SUPPORT STRUCTURE AND A LOCKED FUEL ASSEMBLY CASE

The invention relates to a fuel assembly for a boiling water reactor, having a bundle of fuel rods being disposed approximately parallel to one another, being retained in a skeleton and being inserted together with the skeleton into a fuel assembly case.

The skeleton contains an upper tie plate on the upper end of the bundle that is retained at a handle, a lower tie plate at the lower end of the bundle, and as a rule a plurality of spacers. The spacers are disposed at a plurality of axial positions of the bundle and include ribs extending transversely to the bundle and laterally supporting the fuel rods through springs and/or knobs. In order for the lower tie plate to be joined to the upper tie plate and the handle, the skeleton includes at least one support element, and corner rods of the bundle and/or other selected fuel rods, which are screwed on both ends to the plates, can be used for the support element. In accordance with Published International Application WO 91/13441, corresponding to U.S. application Ser. No. 924,056, filed Aug. 28, 1992, a central water tube can also be used as a support element, on which the spacers are secured and in which the lower tie plate and the upper tie plate with the handle are retained on both ends the tube through screw fasteners. Once the fuel rods have been introduced, the skeleton and the bundle of fuel rods form an insert that can be inserted into or removed from the fuel assembly case that laterally surrounds the bundle and is open at the top. By lifting the handle, the skeleton with the fuel rods and the fuel assembly case slipped onto it can be removed from the core lattice of the boiling water reactor for inspection or repair purposes after an operating cycle, or for replacement purposes.

The invention also relates to a locking means, which can also be used with other fuel assemblies, that releasably hold the fuel assembly case on the head part of the fuel assembly.

It is accordingly an object of the invention to provide a fuel assembly for a boiling water reactor with a redundant support structure and a locked fuel assembly case, which overcomes the hereinafore-mentioned disadvantages of the heretofore-known devices of this general type and which assures that the skeleton and the fuel rod bundle can be lifted and moved on the handle even if there is no longer any load-bearing connection between the lower tie plate and the upper tie plate in the skeleton as a result of damage, such as torn or broken screw fasteners of the support rods or the water tube.

With the foregoing and other objects in view there is provided, in accordance with the invention, a fuel assembly for a boiling water reactor, comprising approximately mutually parallel fuel rods in a bundle having upper and lower ends; a skeleton holding the bundle and having a handle, an upper tie plate retained on the handle at the upper end of the bundle, a lower tie plate at the lower end of the bundle, and at least one support element joining together the lower tie plate and the upper tie plate; a fuel assembly case in which the skeleton and the bundle are inserted; and redundant support means (in particular support means disposed outside the fuel assembly skeleton) holding the lower tie plate, the fuel assembly case and the upper tie plate together, when the handle is lifted.

In accordance with another feature of the invention, there is provided a base part secured to the fuel assembly case, the lower tie plate being inserted into the base part, and the redundant support means including a releasable upper stop engaging the fuel assembly case and the upper tie plate or the handle.

In accordance with a further feature of the invention, the fuel assembly case has a lower part disposed at the lower tie plate, and the redundant support means include an upper stop engaging the fuel assembly case and one of the upper tie plate and the handle, the upper stop defining a maximum distance between the handle and the lower part of the fuel assembly case, at least when the handle is lifted.

In accordance with an added feature of the invention, there is provided a base plate carrying the lower tie plate, the fuel assembly case having an upper part disposed at the upper tie plate, the redundant support means including a releasable lower stop engaging the fuel assembly case and at least one of the lower tie plate and the base plate, and the lower stop defining a maximum distance between the lower tie plate and the upper part of the fuel assembly case, at least when the fuel assembly case is lifted.

In accordance with an additional feature of the invention, the fuel assembly case has a recess formed therein, the skeleton has a stop surface opposite the recess, at least the upper stop is retained in the recess and against the stop surface in an installed state of the fuel assembly, for instance by frictional forces or spring forces, and at least the upper stop is movable by counter forces with a tool far enough to displace the fuel assembly case relative to the skeleton, or to displace the upper tie plate with the handle relative to the fuel assembly case, for disassembly of the fuel assembly.

In accordance with yet another feature of the invention, the lower stop is a screw passing through the fuel assembly case and the base part transversely to the axis of the fuel assembly, the screw having a head being countersunk in the fuel assembly case from the outside and a bore formed in the screw being accessible from inside the base part and facing toward the head, the bore being flared open after the screw has been screwed into the base part.

In accordance with yet a further feature of the invention, the upper stop is resiliently retained on the skeleton and reaches through a window 16 formed in the fuel assembly case in a direction transverse to the axis of the fuel assembly.

With the objects of the invention in view, there is also provided a fuel assembly installed in a boiling water reactor, comprising a bundle of approximately mutually parallel fuel rods; a lower end having a base part and a lower tie plate forming a lower stop for the fuel rods; an upper end having an upper tie plate forming an upper stop for the fuel assembly, having a laterally protruding distance piece, and having a handle connected to the upper tie plate and to the distance piece; spacers for laterally fixing the fuel rods in place; a fuel assembly case laterally surrounding the bundle with the spacers, the lower tie plate and the upper tie plate; means for retaining the lower end at the fuel assembly case; and a locking spring being retained by the upper end and having a locking element reaching through a window formed in the fuel assembly case.

In accordance with yet an added feature of the invention, the tension spring, the locking spring and the tension spring having restoring forces, the upper end being displaceable toward the lower end counter to the restoring force of the tension spring, and the locking element being movable out of the window counter to the restoring force of the locking spring, with the upper end displaced.

In accordance with yet an additional feature of the invention, the fuel assembly case has an upper part, the locking spring has a spring element resting flatly on the upper part of the fuel assembly case in the direction of the lower end, the spring element is secured to the upper end and has a lower end engaging the window from above in hook-like fashion.

In accordance with again another feature of the invention, the locking spring has an engagement surface, and the upper end has a disassembly bore formed therein leading to the engagement surface from above.

In accordance with again a further feature of the invention, the locking element is a locking bar being held by the upper end, being displaceable counter to the restoring force of the locking spring, and protruding into another window formed in the upper end.

In accordance with again an added feature of the invention, the other window in the upper end is a recess in which the locking spring and the locking bar are supported, and the locking bar has an end being supported in the recess and pressed outward.

In accordance with again an additional locking element is a latch being held by the upper end and pivotable approximately at right angles to the axis of the fuel assembly counter to the restoring force of the locking spring.

In accordance with still another feature of the invention, the fuel assembly case has corners, the pivotable latch has a joint part, the upper end has a frame part resting inside one of the corners of the fuel assembly case, the frame part has a recess formed therein, and the locking spring and the joint part are supported in the recess.

In accordance with still a further feature of the invention, the recess forms a joint socket, the joint part and the joint socket have corresponding approximately hemispherical or cylindrical shapes, and the joint part rolls on the joint socket.

In accordance with still an added feature of the invention, the corner of the fuel assembly case is formed by two adjacent walls toward which the recess is open, and the latch is laterally introduced into the recess, has considerable play in all directions in the recess and is retained by the locking spring.

In accordance with a concomitant feature of the invention, the locking element has a forked tongue engaging corresponding windows formed in the walls of the fuel assembly case meeting one another in the corner of the fuel assembly case.

Other features which are considered as characteristic for the invention are set forth in the appended claims.

Although the invention is illustrated and described herein as embodied in a fuel assembly for a boiling water reactor with a redundant support structure and a locked fuel assembly case, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
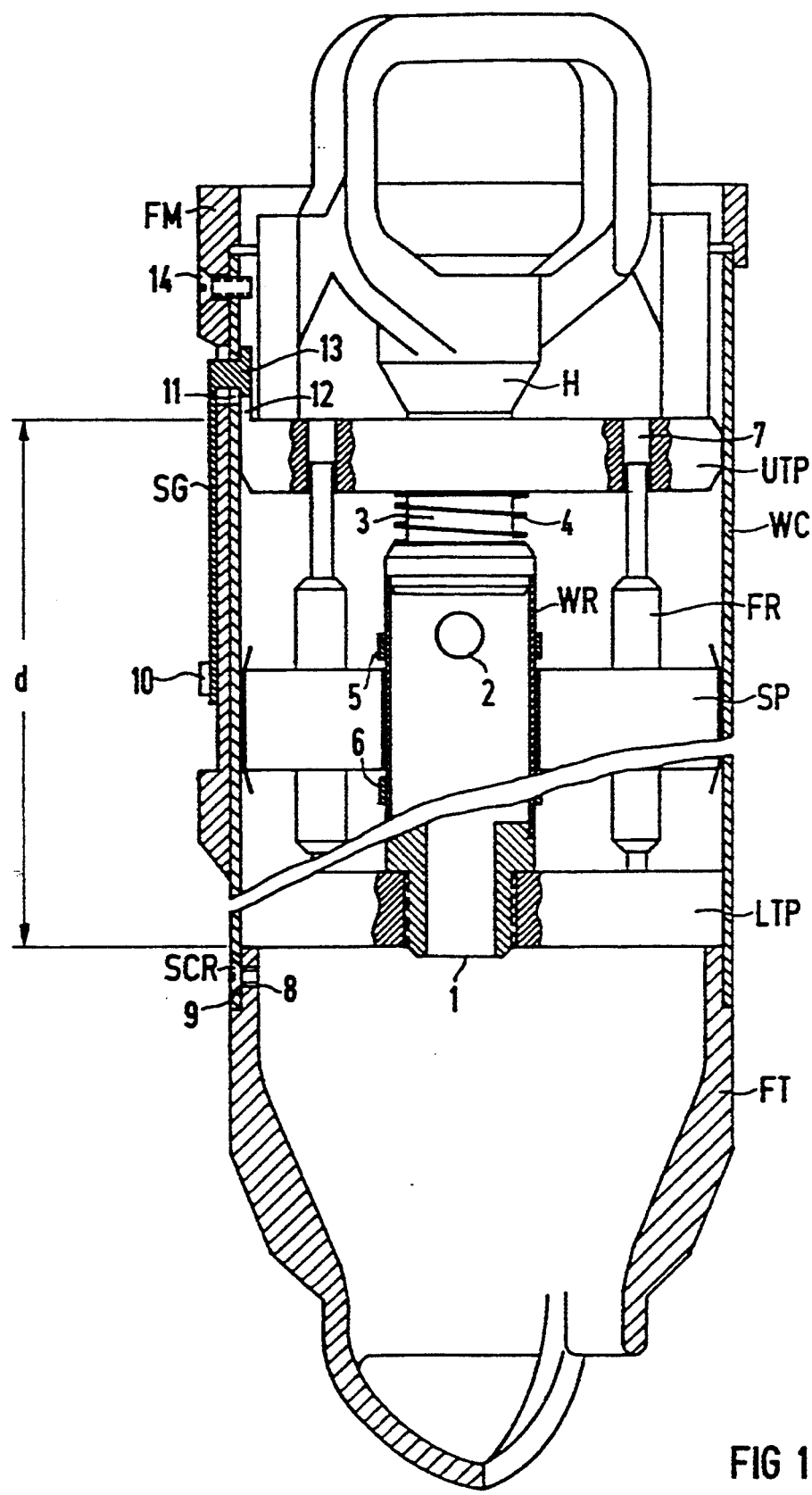
FIG. 1 is a fragmentary, diagrammatic, partly broken-away, longitudinal-sectional view of upper and lower ends of a fuel assembly in a fully installed state.

Referring now to the figures of the drawing in detail, and first, particularly, to FIG. 1 thereof, there is seen a preferred exemplary embodiment of a fuel assembly which includes a support element in the form of a central coolant tube (water tube) WR, that forms a flow channel for liquid coolant and has openings 1, 2 at the bottom and the top and extends from a lower tie plate LTP to an upper tie plate UTP. The bottom plate or lower tie plate LTP is screwed to a lower end piece of the water tube WR. An upper end piece also has a screw fastening, and in this case a bolt 3 of the tube WR reaches through an opening in the cover plate or upper tie plate UTP and in a handle H mounted on it. A protruding end of the bolt 3 has a thread on which a nut is mounted that forms a stop for the handle and the upper tie plate UTP. In FIG. 1, this nut does not become visible until the handle and the upper tie plate are pressed against a compressed tension spring 4 inserted between the water tube and the upper tie plate. Once this spring is relieved, the nut vanishes in a profiled recess in the handle H in which this nut is secured against being unintentionally turned and loosened.

At various axial positions of the water tube, spacers SP are held between stops 5 and 6. Ribs of this spacer SP form voids in which fuel rods FR are supported. Upper end caps of these fuel rods are constructed as bolts and are loosely guided in bores 7 in the upper tie plate UTP.

The coolant tube, spacer, lower and upper tie plates and fuel rods accordingly form an insert, which can be held at the handle H and inserted from above or below into a fuel assembly box or case or water channel WC that is open at the bottom and top. In the process this insert with the lower tie plate LTP comes to rest on an upper edge of a base part FT on which the lower tie plate can be set or even welded. A skeleton for the bundle of fuel rods includes the handle H, the upper tie plate UTP, the lower tie plate LTP and the support element or water tube WR. If the lower tie plate LTP is welded to the base plate FT, then it also forms part of the skeleton onto which the water channel WC can be slid from above. The entire, fully installed fuel assembly can be lifted with the handle. A distance d between the upper surface of the upper tie plate UTP and the bottom of the lower tie plate LTP is substantially constant with this construction of the load-bearing skeleton. In other words, the distance d varies only as a result of the thermal expansion of the water tube WR, and this construction also enables a thermal expansion of the fuel rods FR to take place.

If the load-bearing skeleton is destroyed, for example if the water tube WR breaks or if one of the screw fasteners that keep the handle H on the upper tie plate and keep the lower tie plate LTP on the water tube WR (or load-bearing fuel rods if applicable) tears, then the lower tie plate held by the base part FT and the fuel rods resting on it can no longer be removed from the core by lifting the handle H. The distance d accordingly increases to the extent by which the handle H is lifted.

The invention therefore provides a redundant support structure that, in addition to the support means of the skeleton, assures that the distance d will not drop below a specific maximum value. This redundant support structure may be formed in a simple manner by the water channel WC and by corresponding stops or retaining means between the water channel and the two plates UTP and LTP, with these stops defining the maximum value d.

To that end, suitable fastening means for the water channel and the lower tie plate, or for the base part FT carrying the lower tie plate, are provided on a lower edge of the cluster or bundle of fuel rods. These fastening means may be a stop retained in the channel wall, which laterally engages the inside of the lower tie plate LTP or fits over this lower tie plate at its lower surface. By way of example, this stop may be a spring clip, for instance, that is secured to the base part and initially engages only a bore oriented toward the water channel, so that the lower edge of the water channel resting on the base part and on the lower tie plate can be slipped onto the base part and the lower tie plate. In that case, the lower edge of the water channel has a corresponding bore as well, into which the spring clip snaps due to its spring force once the water channel has been slipped on, so that the spring clip then forms a stop that engages recesses in the base part (or the lower tie plate) and in the water channel and so that when the water channel is lifted, a maximum value for the distance d between the lower tie plate and the upper edge of the water channel that rests on the upper tie plate UTP is defined.

Naturally, a corresponding spring clip may be secured to the outside of the base part FT or to the outer surface of the side of the water channel, so that once the water channel has been slipped on it will engage corresponding recesses in the water channel and in the base part FT (or in the lower tie plate LTP) and be held in that position.

In FIG. 1, a screw SCR is provided as the lower stop. Once the case has been installed, this screw SCR is screwed into a threaded bore 8 in the base part FT, through a corresponding hole 9 that is shaped for receiving the head of the screw and is provided in the lower edge of the case. Since this screw is seated at a point of the fuel assembly that is virtually unstrained thermally, and mechanically as well if the supporting skeleton is intact, then it is sufficient for retention of this stop to adapt the threaded bore 8 to the screw profile with adequate play, so that the screw can be inserted into the threaded bore 8 with only a little exertion of force, and the resultant frictional forces can hold this screw.

Since the lateral position of the lower tie plate LTP resting on the base part is also fixed because of the retention of the water channel on the base part, it is possible in this construction to dispense with a weld connection between the lower tie plate and the base part. Unless it is necessary to make the fuel rods inserted into the skeleton laterally accessible for inspection purposes, the lower tie plate can be fixed to the water channel and to the base part by welding them together, instead of having to provide a screw or a corresponding stop.

A stop disposed between the water channel and the plate and retained by a spring clip in the described way is shown in FIG. 1 as a retainer for the upper tie plate UTP.

Typically, the handle and the upper tie plate have a frame that on one hand fits over the upper edge of the water channel WC for retaining it and on the other hand serves as a bearing surface for fuel assemblies adjacent the frame in the reactor core. According to FIG. 1, a spring clip or locking spring SG, having a free end which reaches through a recess 11 in the water channel and rests with a locking element in the form of a profiled part 13 on a stop surface 12 of the upper tie plate UTP, is secured to the outer surface of a frame or laterally protruding distance piece FM by lock means 10. Through the use of the compressed tension spring 4, the upper tie plate UTP has been pushed so far upward that the profiled part 13 of the spring clip SG is retained captive between the stop surface 12 and the case wall even if the spring clip SG itself should break. Alternatively or in addition, FIG. 1 shows a screw 14, with which the frame FM, water channel WC and handle H are screwed together in this position, in the manner already described for the screw SCR serving as a lower stop.

This construction assures that even if the load-bearing parts of the supporting skeleton break (for instance if there is a broken water tube WR), a maximum value for the distance d between the upper tie plate UTP and the lower edge of the water channel WC itself (and therefore the bearing of the lower tie plate LTP resting there) will not be exceeded even if the fuel assembly is lifted at the handle H.

In order to remove the coolant tube, the upper tie plate UTP is pressed against the tension spring 4, so that the profiled part 13 of the spring clip and the recess 11 in the fuel assembly case adapted to it face one another, the profiled part 13 can be bent outward by a tool through the recess 11, and the fuel assembly case WC can be pulled off. The screws SCR and 14 are loosened in the process. When the fuel assembly is installed, the procedure is correspondingly the reverse. The spring clip is first bent outward far enough by a suitable tool that the fuel element case can be slipped into the skeleton until, when the spring clip is released, with the upper tie plate pressed downward, the profiled part can snap through the opening 11 into its terminal position and lock in the terminal position specified by the profiled part 12 when the spring 4 is relaxed.

A corresponding spring clip that locks into place in a recess in the fuel assembly case can naturally be secured to the upper tie plate UTP or to the top of the frame FM instead of to the side of the frame. It is equally possible to provide a stop that is held on the fuel assembly case by spring forces or frictional forces, which engages a corresponding opening in the frame and/or in the handle and/or in the upper tie plate.

Figure 2:
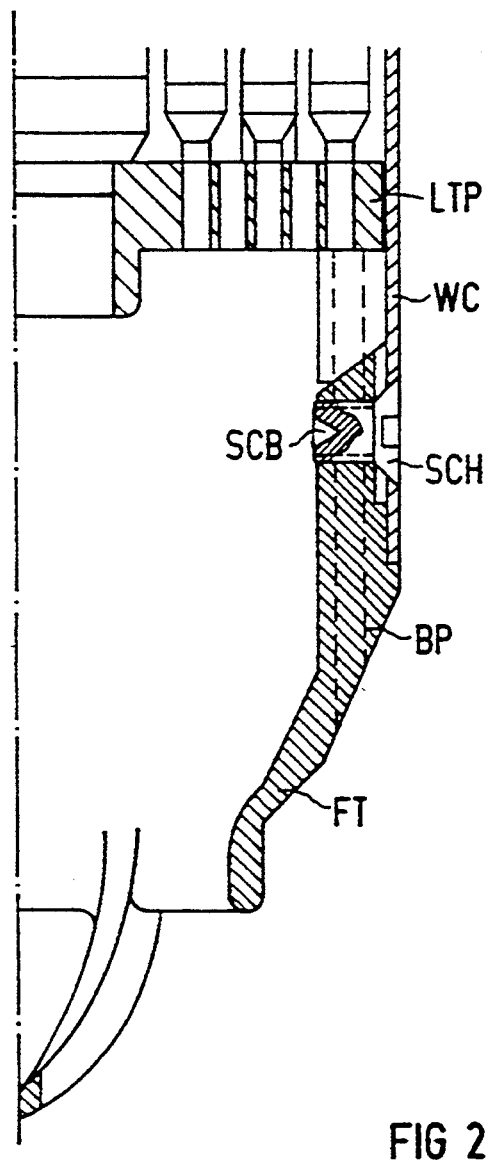
FIG. 2 is a fragmentary, longitudinal-sectional view of part of the lower end.

Accordingly, while the profiled part 13 forms an upper stop for the fuel assembly case, with the stop being resiliently held on the skeleton and reaching transversely to the fuel assembly axis through a window (recess 11) in the case, the lower stop is advantageously constructed as a screw that reaches through the fuel assembly case and the base part. As is seen in FIG. 2, this screw is approximately transverse to the fuel assembly axis and has a head SCH that is countersunk from the outside into the fuel assembly case, while a threaded part has a bore SCB that is oriented toward the screw head SCH and is accessible from the interior of the base part. This bore SCB is slightly flared open once the screw has been screwed into the base part. As a result, the threaded part of the screw is firmly pressed into the contrary thread of the base part, producing a connection between the case and the base part that is releasable only by damaging the screw. In this way, the screw itself is secured against being lost.

It is practical to reinforce the base part in the region of the screw, and FIG. 2 shows that bypass bores BP, through which coolant can be introduced into the region of the fuel rods, can be disposed inside this reinforced part.

A locking element that locks resiliently in detent fashion into corresponding receiving points of the fuel assembly case and of the upper part (upper end of the skeleton), and that is therefore simple to release but is secured in captive fashion on the fuel assembly, can advantageously be used as the upper stop that keeps the fuel assembly case supportingly on the upper part.

This kind of locking means can also be used if the fuel assembly does not include any skeleton that would form an integrated insert which would be removable from the fuel assembly case along with the fuel rods. The invention therefore relates to fuel assemblies for a boiling water reactor that contain a cluster or bundle of fuel rods FR that are approximately parallel to one another, spacers SP for lateral fixation of the fuel rods, a lower end with a base part FT and a lower tie plate LTP as a stop for the fuel rods FR, an upper end with an upper tie plate UTP as a-stop for the fuel assembly and a handle H connected to the upper tie plate and to the frame or distance piece FM, and a fuel assembly case WC laterally surrounding the cluster or bundle along with the spacers SP, the lower tie plate and the upper tie plate. Through the use of screw fasteners or other retaining means, the lower end is held on the fuel assembly in the installed state, and the lower tie plate serves as a lower stop for the fuel rods. The upper tie plate on the upper end correspondingly acts as an upper stop for the fuel rods, and this upper end includes a handle that is connected to the upper tie plate and to a distance piece laterally protruding beyond it.

Figure 3:
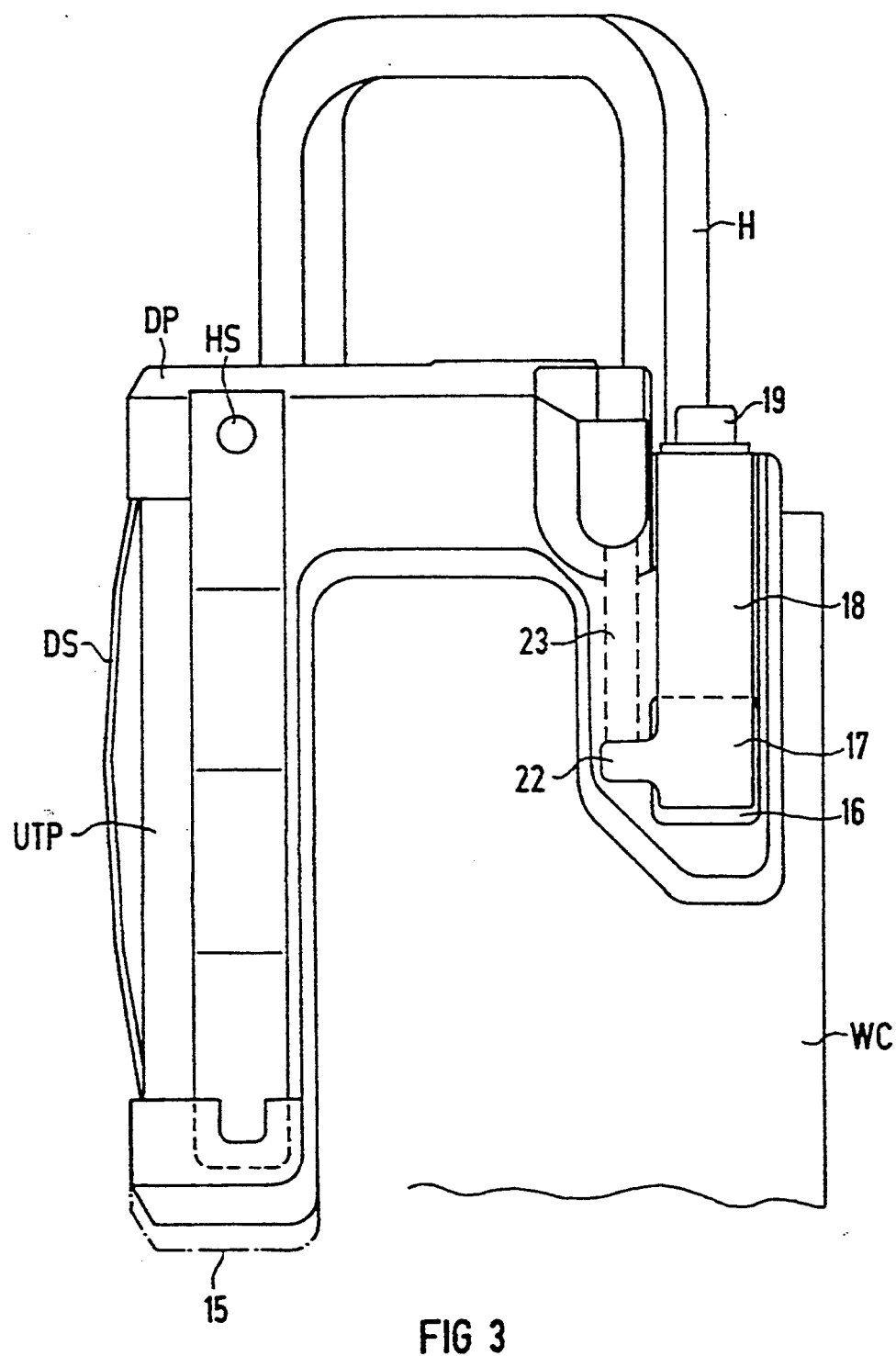
FIGS. 3 and 4 are two fragmentary, longitudinal-sectional views of an upper part with a screwed-on spring for locking a fuel assembly case to the top part.
Figure 4:
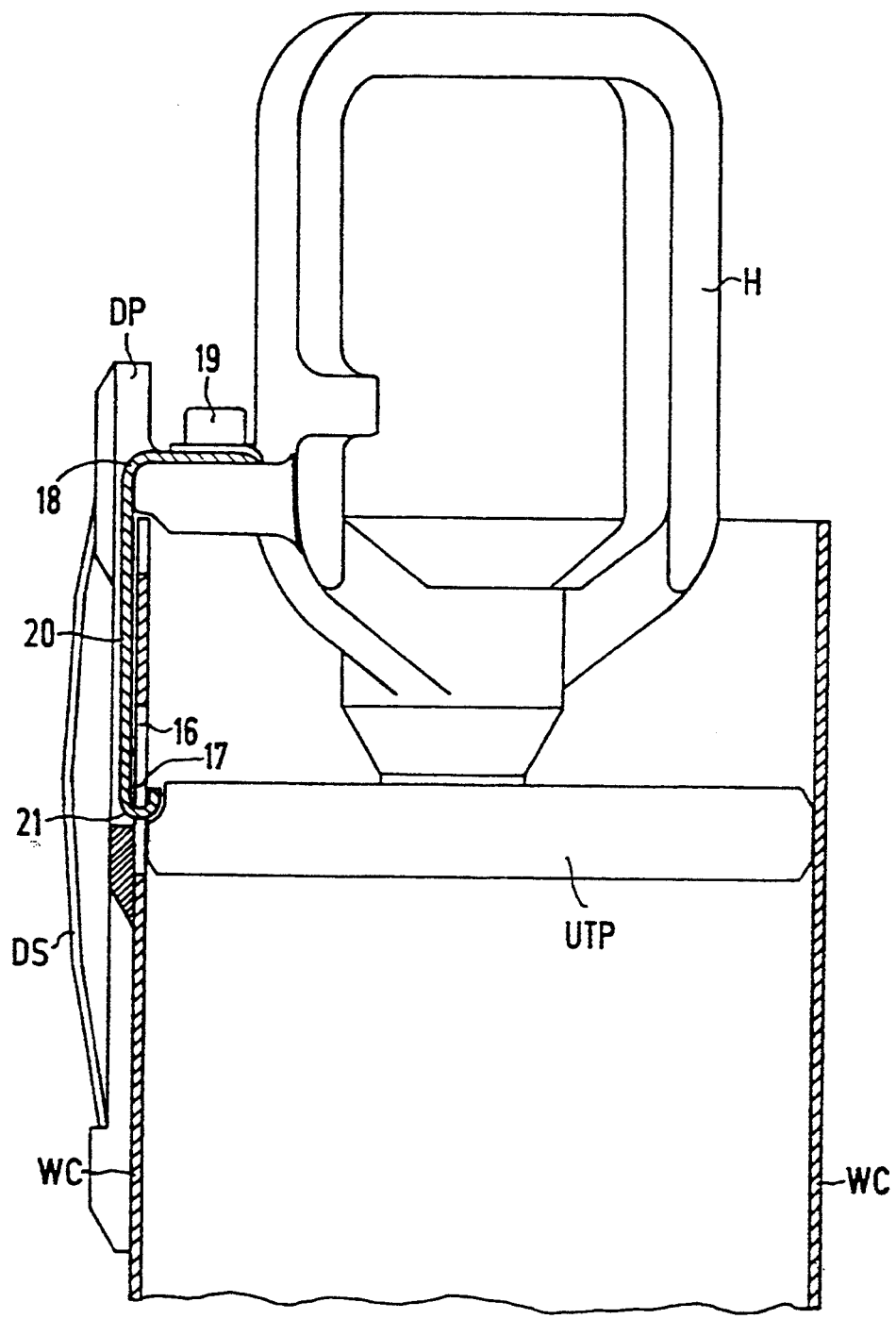

FIGS. 3 and 4 show two longitudinal sections through an exemplary embodiment, in which a spring with a locking element reaching through a window of the fuel assembly case is held on the upper end.

In FIG. 3, the fuel assembly case WC, which has a polygonal and in particular a square cross section, and the handle H, can be seen. The handle forms a component that is cast in one piece with the upper tie plate UTP and a frame having a distance piece DP, or is held together in some other way. The distance piece DP fits over the upper edge of the fuel assembly case WC on at least two sides and forms a bearing surface on which adjacent fuel assemblies rest, in the core structure. It may be advantageous to hold a distance spring DS on the head by means of a fastening screw HS, in order to support the fuel assembly against adjacent fuel assemblies.

In the case of assembly and disassembly, the upper end with the upper tie plate and the distance piece can be displaced toward the lower end, counter to the restoring force of the tension spring 4 that was already shown in FIG. 1, into a position 15 that is represented by a phantom line.

As a result, a locking element 17 that reaches through a window 16 can be moved out of the window 16. This locking element 17 is retained on the upper part of the fuel assembly by a locking spring or spring element 18. It can therefore be bent out of the window counter to the restoring force of this locking spring.

As FIG. 4 shows, the locking spring is secured on the upper part due to the fact that one end of the spring is screwed to the distance piece DP by a retaining screw 19. The locking spring 18 has a spring part 20 resting flatly on the upper part of the water channel WC in the direction of the lower end, and the locking spring 18 has a lower hook-like end 21 which engages the window 16 in hook-like fashion from above as an upper stop. Accordingly, if the upper end of the fuel assembly case is lifted at the handle H, then the case is suspended in the hook-like end 21 of the locking spring.

Advantageously, this kind of locking spring 18 that is constructed as a leaf spring has an engagement surface in the form of a strap 22 which may be disposed laterally, for instance, so that the spring can be bent out of the window 16. FIG. 3 shows that the frame of the upper part also has disassembly bores 23 leading to this engagement surface 22, and a pin for moving the spring could be introduced through these bores.

Figure 5:
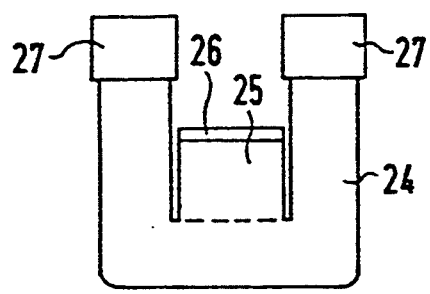
FIG. 5 is an elevational view of a locking spring constructed as a leaf spring.

An advantageous spring shape is also shown in FIG. 5, wherein a spring has a middle part 24 bent into a U and it has a flat spring part 25 pointing upward, with a locking element 26. Ends 27 of legs of the spring may be suspended from or screwed or welded to the upper part, while the locking element 26 engages the window of the fuel assembly case.

Instead of leaf springs, which sometimes tend to break, helical springs can also be used as the locking springs- in particular, a locking bar that is held by the upper part, is displaceable counter to the restoring force of the helical locking spring, and protrudes into the window of the fuel assembly case can be used as the locking element.

Figure 6:
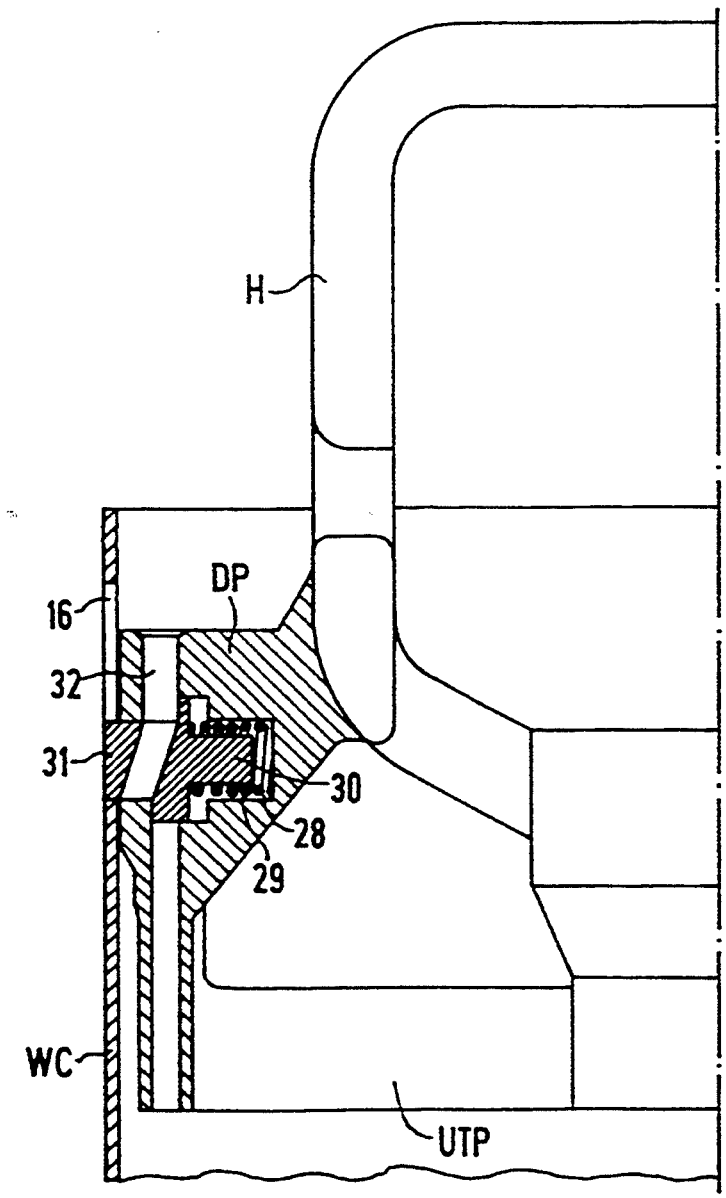
FIG. 6 is a fragmentary, cross-sectional view of the upper end of the fuel assembly and of the case, with a displaceable locking bolt.

FIG. 6 shows this kind of structure, in which the distance piece DP forming the frame of the upper part has a window or recess 28 formed therein, in which a helical locking spring 29 is supported in such a way that one end 30 of a locking element in the form of a bar that is located in the recess, is pressed outward. In this outwardly pressed position, another end 31 of the locking bar engages the inside of the window 16 of the water channel WC. Once again, a disassembly bore 32 makes it possible to press the locking bar back by the insertion of a pin, thereby compressing the spring 29 and freeing the window 16 in the water channel.

In the preferred embodiment, the locking element is constructed as a latch that is held by the upper part and is pivotable approximately perpendicularly to the fuel assembly axis, counter to the restoring force of the locking spring.

Figure 7:
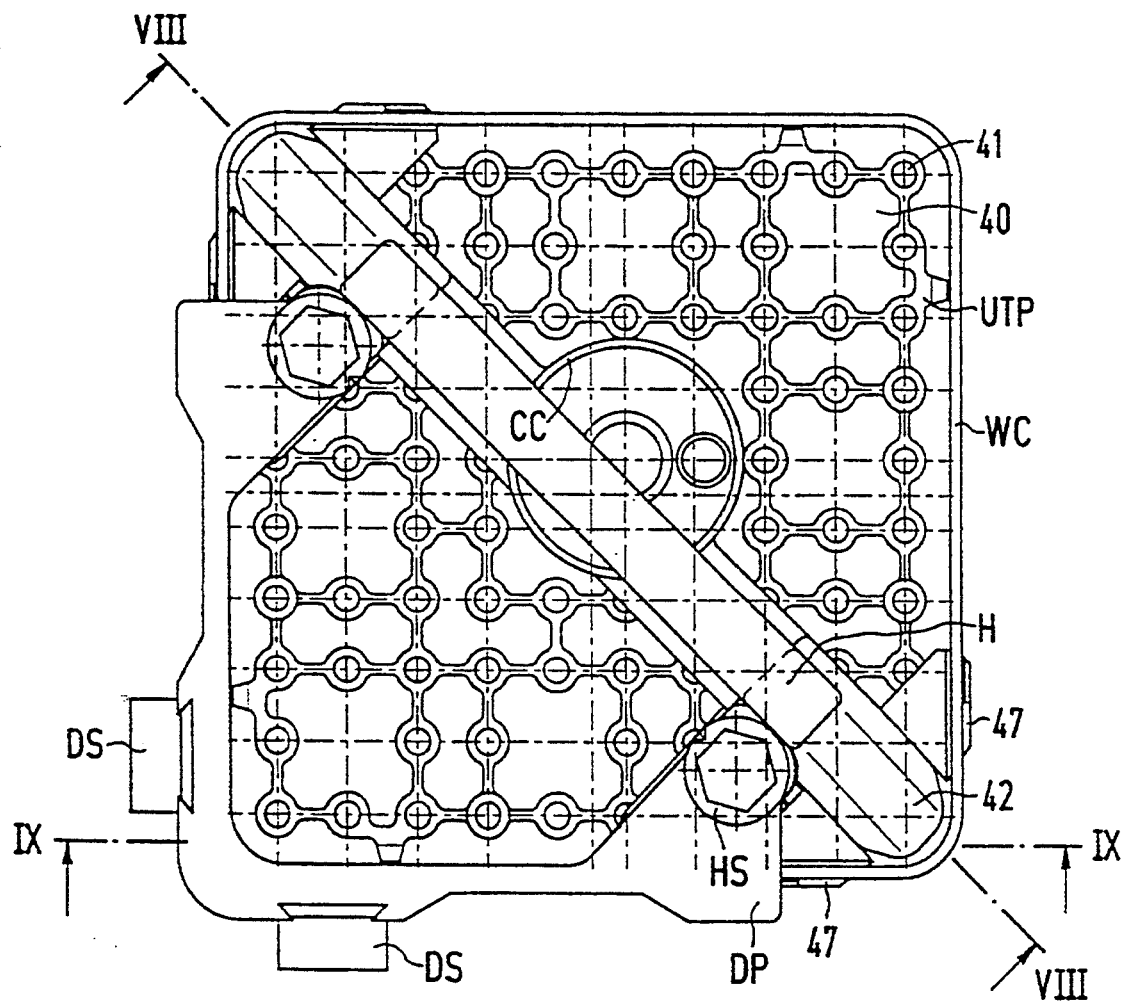
FIG. 7 is a plan view of the upper end of the fuel assembly.
Figure 8:
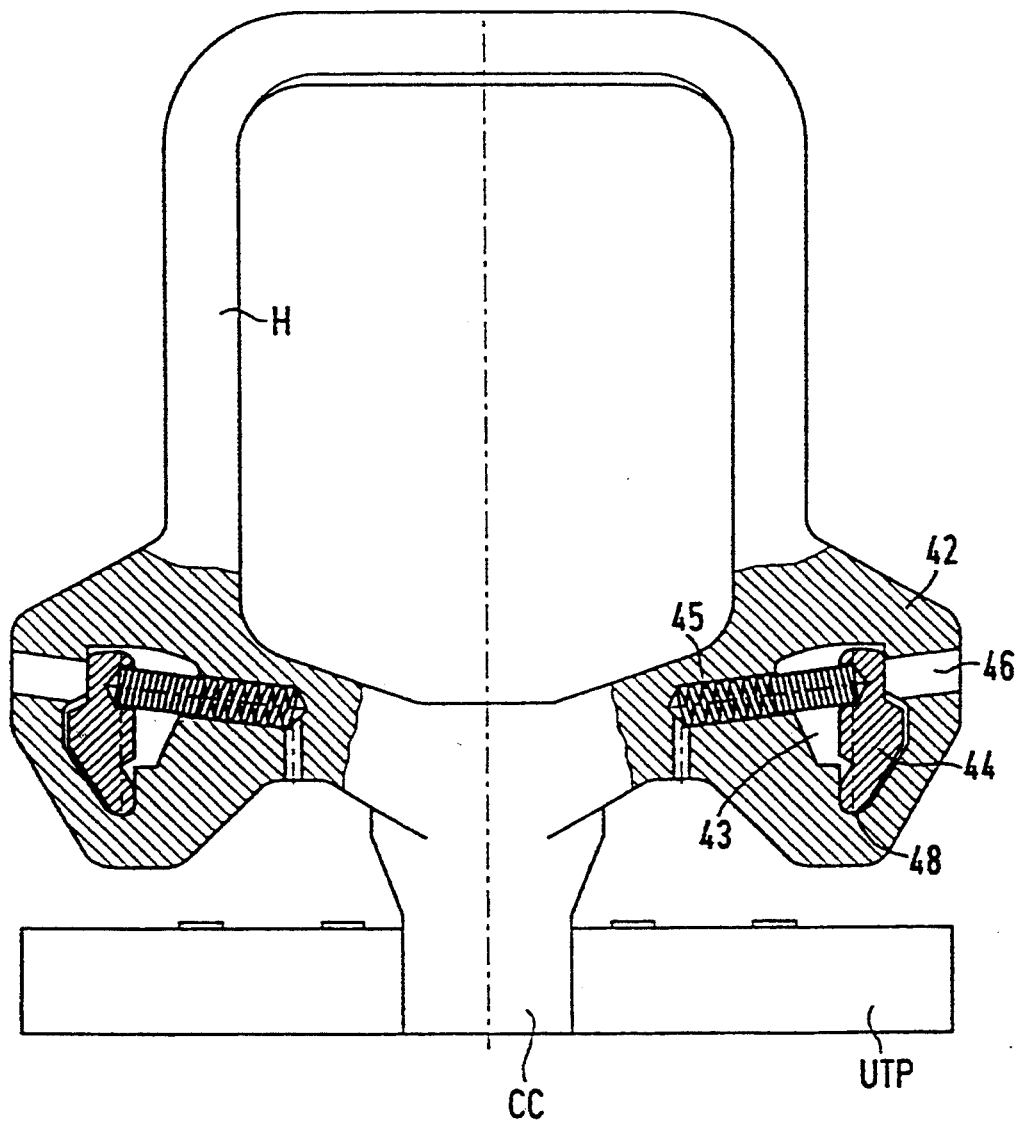
FIGS. 8 and 9 are longitudinal-sectional views of the upper end which are taken along respective lines VIII—VIII and IX—IX of FIG. 7, in the direction of the arrows.
Figure 9:
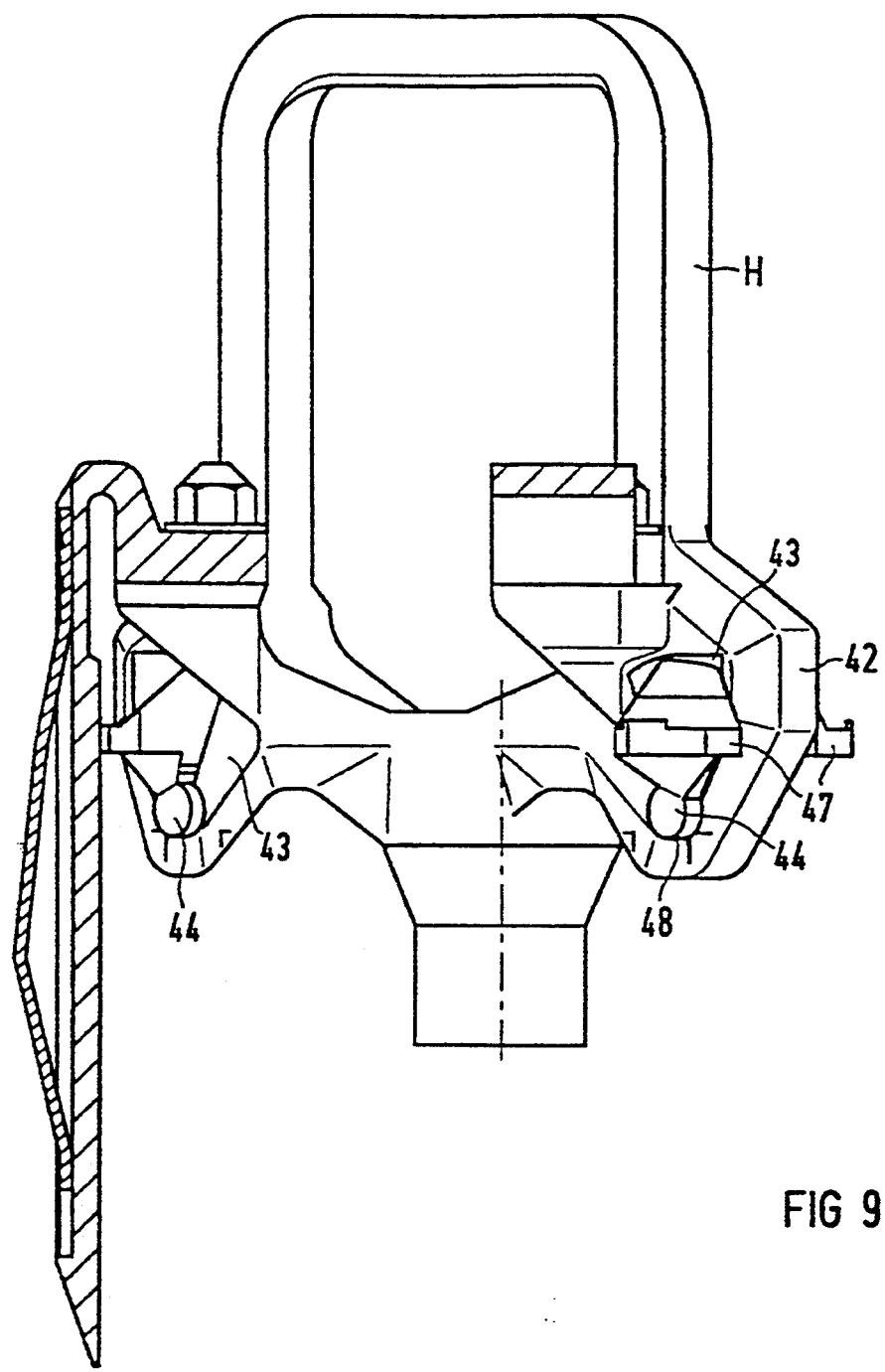

Such an embodiment is shown in FIG. 7 in a plan view of the upper part of the fuel assembly, in FIG. 8 in a cross section through the handle, and in FIG. 9 in a longitudinal section through the upper part.

In this case, the upper part is provided in multiple parts and includes a hoop of the handle H extending diagonally across the rectangular cross section of the fuel assembly and merging with frame parts that rest on opposite corners of the water channel WC from the inside and through which frame parts another frame part that fits over the upper edge of the fuel assembly case is screwed on by means of fastening screws HS. This other frame part carries the distance springs DS, acting as the distance piece DP, on which the upper parts of adjacent fuel assemblies are supported.

The upper tie plate UTP has through-flow openings 40 for the coolant and guide openings 41 for the upper cap pieces of the fuel rods and is secured to a slightly eccentric central case CC, which is cast onto the handle.

It can be seen from FIG. 8 that a frame part 42 which rests from the inside on one corner of the fuel assembly case, has a recess 43 formed therein, in which a joint element 44 of a latch and a locking spring 45 are supported. In the case of installation, the locking spring 45 can be inserted through a bore 46 and compressed enough to permit the locking element, of which only the joint part 44 is visible in FIG. 8, to be inserted into the recess 43 from the side.

This type of recess, support and installation may also be provided for the locking bar of FIG. 6. The locking element may then include a tongue that reaches through the opening 46 diametrically into a corresponding window in the corner of the fuel assembly case. However, FIG. 9 shows that the locking element has a forked tongue 47, so that it can engage corresponding windows of abutting case walls in the corner of the fuel assembly case.

The recess 43 has a lower part which forms an approximately hemispherical or partially cylindrical joint socket 48. The joint part 48 accordingly likewise has a hemispherical or partially cylindrical end, with the radius of curvature of the joint part being less than the radius of curvature of the socket. Upon a pivoting motion of the locking element, this half-round profile of the joint part accordingly rolls along the socket.

It can be seen from FIGS. 6 and 8 that the locking element can be seated in the recess 43 with considerable play to all sides, because its final position is fixed once the locking spring presses the locking element outward and the locking bars or tongues engage the inside of the window. This makes installation easier and lessens the danger of the locking element sticking to the frame part after the fuel assembly has been in use for a relatively long period in a nuclear reactor because of corrosion or soiling, which would prevent it from being pushed back counter to the restoring force of the locking spring when the fuel assembly is being dismantled. In particular, such factors are virtually no threat to the pivoting motion of the latch of FIGS. 7 through 9, because the generous play means that it can easily be broken loose and can roll along the joint socket even over layers of corrosion and dirt.

When the fuel assembly is installed, the resilient locking parts automatically snap into the windows and openings that are provided for retaining the fuel assembly case on the upper part of the fuel assembly, as soon as the upper part is inserted into the case. In the case of disassembly, the screws 19 in FIG. 4 and HS in FIGS. 3 and 7 that are involved in this fastening, need not be loosened. If the connection is constructed as a resiliently supported locking bar or latch, then there is also no danger that leaf springs might break or that parts of the lock might loosen and be lost in the flow of coolant, where they could cause considerable disruption to the system.

Naturally, corresponding resilient locking means may also be provided as a releasable connection between the lower end of the fuel assembly case and the lower end of the fuel assembly, but in this region of the fuel assembly they are unnecessary in many cases because of the low thermal and mechanical strain.

We claim:

1. A fuel assembly for a boiling water reactor, comprising:
   a) approximately mutually parallel fuel rods in a bundle having upper and lower ends;
   b) a skeleton holding said bundle and having a handle, an upper tie plate retained on said handle at said upper end of said bundle, a lower tie plate at said lower end of said bundle, and at least one support element joining together said lower tie plate and said upper tie plate;
   c) a fuel assembly case in which said skeleton and said bundle are inserted; and
   d) redundant support means holding said lower tie plate, said fuel assembly case and said upper tie plate together independently of said skeleton, when said handle is lifted.

2. The fuel assembly according to claim 1, including a base part secured to said fuel assembly case, said lower tie plate being inserted into said base part, and said redundant support means including a releasable upper stop engaging said fuel assembly case and one of said upper tie plate and said handle.

3. The fuel assembly according to claim 1, wherein said fuel assembly case has a lower part disposed at said lower tie plate, and said redundant support means include an upper stop engaging said fuel assembly case and one of said upper tie plate and said handle, said upper stop defining a maximum distance between said handle and said lower part of said fuel assembly case, at least when said handle is lifted.

4. The fuel assembly according to claim 1, including a base plate carrying said lower tie plate, said fuel assembly case having an upper part disposed at said upper tie plate, said redundant support means including a releasable lower stop engaging said fuel assembly case and at least one of said lower tie plate and said base plate, and said lower stop defining a maximum distance between said lower tie plate and said upper part of said fuel assembly case, at least when said fuel assembly case is lifted.

5. The fuel assembly according to claim 3, wherein said fuel assembly case has a recess formed therein, said skeleton has a stop surface opposite said recess, said stop is retained in said recess and on said stop surface in an installed state of the fuel assembly, and said stop is movable by a tool far enough to displace said fuel assembly case relative to said skeleton for disassembly of the fuel assembly.

6. The fuel assembly according to claim 4, wherein said fuel assembly case has a recess formed therein, said skeleton has a stop surface opposite said recess, said stop is retained in said recess and on said stop surface in an installed state of the fuel assembly, and said stop is movable by a tool far enough to displace said fuel assembly case relative to said skeleton for disassembly of the fuel assembly.

7. The fuel assembly according to claim 4, wherein said lower stop is a screw passing through said fuel assembly case and said base part transversely to the axis of the fuel assembly, said screw having a head being countersunk in said fuel assembly case from the outside and a bore formed in said screw being accessible from inside said base part and facing toward said head, said bore being flared open after said screw has been screwed into said base part.

8. The fuel assembly according to claim 3, wherein said upper stop is resiliently retained on said skeleton and reaches through a window 16 formed in said fuel assembly case in a direction transverse to the axis of the fuel assembly.

9. A fuel assembly installed in a boiling water reactor, comprising:
 a) a bundle of approximately mutually parallel fuel rods;
 b) a lower end having a base part and a lower tie plate forming a lower stop for said fuel rods;
 c) an upper end having an upper tie plate forming an upper stop for said fuel rods, having a laterally protruding distance piece, and having a handle connected to said upper tie plate and to said distance piece;
 d) spacers for laterally fixing said fuel rods in place;
 e) a fuel assembly case laterally surrounding said bundle with said spacers, said lower tie plate and said upper tie plate;
 f) means for retaining said lower end at said fuel assembly case; and
 g) a locking spring being retained by said upper end and having a locking element reaching through a window formed in said fuel assembly case.

10. The fuel assembly according to claim 9, including a tension spring, said locking spring and said tension spring having restoring forces, said upper end being displaceable toward said lower end counter to the restoring force of said tension spring, and said locking element being movable out of said window counter to the restoring force of said locking spring, with said upper end displaced.

11. The fuel assembly according to claim 9, wherein said fuel assembly case has an upper part, said locking spring has a spring element resting flatly on said upper part of said fuel assembly case in the direction of said lower end, said spring element is secured to said upper end and has a lower end engaging said window from above in hook-like fashion.

12. The fuel assembly according to claim 11, wherein said locking spring has an engagement surface, and said upper end has a disassembly bore formed therein leading to said engagement surface from above.

13. The fuel assembly according to claim 9, wherein said locking element is a locking bar being held by said upper end, being displaceable counter to the restoring force of said locking spring, and protruding into said window.

14. The fuel assembly according to claim 13, wherein in another window formed in said upper end said locking spring and said locking bar are supported in another window formed in said upper end, and said locking bar has an end being supported in said recess and pressed outward.

15. The fuel assembly according to claim 9, wherein said locking element is a latch being held by said upper end and pivotable approximately at right angles to the axis of the fuel assembly counter to the restoring force of said locking spring.

16. The fuel assembly according to claim 15, wherein said fuel assembly case has corners, said pivotable latch has a joint part, said upper end has a frame part resting inside one of said corners of said fuel assembly case, said frame part has a recess formed therein, and said locking spring and said joint part are supported in said recess.

17. The fuel assembly according to claim 16, wherein said recess forms a joint socket, said joint part and said joint socket have corresponding approximately hemispherical shapes, and said joint part rolls on said joint socket.

18. The fuel assembly according to claim 16, wherein said recess forms a joint socket, said joint part and said joint socket have corresponding approximately cylindrical shapes, and said joint part rolls on said joint socket.

19. The fuel assembly according to claim 16, wherein said corner of said fuel assembly case is formed by two adjacent walls toward which said recess is open, and said latch is laterally introduced into said recess, has play in all directions in said recess and is retained by said locking spring.

20. The fuel assembly according to claim 19, wherein said locking element has a forked tongue engaging corresponding windows formed in said walls of said fuel assembly case meeting one another in said corner of said fuel assembly case.

* * * * *